(12) United States Patent
Horne

(10) Patent No.: US 6,612,323 B1
(45) Date of Patent: Sep. 2, 2003

(54) SAFETY VALVE FOR APPLIANCES UTILIZING WATER FROM A PRESSURIZED SOURCE

(75) Inventor: Gregory L. Horne, Argyle, TX (US)

(73) Assignee: Curio Ltd., Fort Worth, TX (US)

( * ) Notice: Subject to any disclaimer, the term of this patent is extended or adjusted under 35 U.S.C. 154(b) by 0 days.

(21) Appl. No.: 10/199,756

(22) Filed: Jul. 18, 2002

(51) Int. Cl.[7] ............................................. G05D 7/06
(52) U.S. Cl. ........................ 137/1; 137/624.11; 137/613
(58) Field of Search ........................ 137/624.11, 624.12, 137/1, 613

(56) References Cited

U.S. PATENT DOCUMENTS

| | | |
|---|---|---|
| 5,918,617 A | 7/1999 | Garth |
| 5,934,302 A | 8/1999 | Nemelka |
| 5,992,218 A | 11/1999 | Tryba et al. |
| 6,003,536 A | 12/1999 | Polverari et al. |
| 6,125,870 A * | 10/2000 | Furmanek .......... 137/624.11 X |
| 6,389,852 B1 * | 5/2002 | Montgomery ........... 137/312 X |
| 6,543,479 B2 * | 4/2003 | Coffey et al. ........... 137/624.11 |
| 6,543,480 B1 * | 4/2003 | Mazzei et al. ......... 137/624.12 |

* cited by examiner

Primary Examiner—Kevin Lee
(74) Attorney, Agent, or Firm—Bracewell & Patterson, L.L.P.

(57) ABSTRACT

A safety valve is provided for an appliance having an electrically operated water inlet valve for receiving water used during operation of the appliance. A valve body is connected to the water supply upstream of the inlet valve, the valve body having a flow path for allowing water to flow through the valve body to the inlet valve. An electrically operated solenoid is connected to a valve gate, the valve gate being movably carried within the valve body and movable between a closed position and an open position that allows water to flow through the flow path. A portion of an electrical current from an appliance control system to the inlet valve for opening the inlet valve is conducted to the solenoid for moving the gate to the open position. The gate is spring biased to the closed position for returning the gate to the closed position when the current ceases to flow.

12 Claims, 2 Drawing Sheets

SAFETY VALVE FOR APPLIANCES UTILIZING WATER FROM A PRESSURIZED SOURCE

BACKGROUND OF THE INVENTION

1. Field of the Invention

The present invention relates generally to electrically operated fluid valves and relates specifically to valves used to control the flow of water to a washing machine or other appliance.

2. Description of the Related Art

Many modern appliances, such as washing machines, icemakers, and dishwashers, require a source of pressurized water for providing the appliance with water during its operation. Typically, the water is provided through a flexible hose connecting an inlet valve on the appliance to a water line, which is usually located in a wall near the appliance. In a washing machine, for example, the flexible hose limits the transfer of vibrations of the washer to the water line and allows for the washer to be moved short distances without disconnecting the hose from the water line. A manually operated valve is usually installed between a water hose and a water line, and a user can close the valve to prevent water from flowing through the hose when the hose is disconnected from the valve or the inlet of the appliance.

Each appliance typically has a control system that operates the inlet valves. In a washing machine, a user-operated timer mounted on the washing machine controls the cycling of the machine through the various functions in the washing process, the timer also opening the inlet valves when water is required in the machine. To allow for the washing machine to remain in a ready-to-use condition, the manual valve on each water line is usually left in the open position, water pressure remaining present in each water hose. This is also true for other appliances, providing the convenience of a ready-to-use appliance. The disadvantage to this is that a rupture of a water hose will allow water to escape, and, if undetected for an extended time, significant damage can result to the surrounding structure housing the appliance.

Several patents have been issued for devices used to address this problem. U.S. Pat. No. 5,918,617 to Garth discloses a system comprising a controller that controls electrically operated valves located at the water source. The controller opens and closes the valves in response to signals from the control system of an appliance, input from a moisture sensor located near the appliance, and the condition of a timer. Likewise, U.S. Pat. No. 5,934,302 to Nemelka discloses a microcontroller that senses current flow to an appliance, indicating that the appliance is in use, and opens water valves when current is flowing, the valves being installed upstream of the washing machine. The device also has pressure sensors for detecting an abnormal drop in the pressure in the water supply line. A similar device is disclosed in U.S. Pat. No. 6,003,536 to Polverari, et al., which has a controller for signaling valves to open when the controller detects the current draw of an appliance.

A leakage-detection system is disclosed in U.S. Pat. No. 5,992,218 to Tryba, et al., in which leak detectors are positioned near and/or in the appliance. The detectors are connected to a control apparatus that controls valves connected to the water supply. If a leak is detected, the control apparatus signals the valves to close, stopping the flow of water.

There is a need for an apparatus for preventing unwanted water flow through hoses connecting an appliance to a pressurized water supply that eliminates the need for a separate controller and power supply, the apparatus being electrically connected to the wiring of the appliance for relying only on the power to the inlet valve and the inlet valve control system of the appliance.

BRIEF SUMMARY OF THE INVENTION

A safety valve is provided for an appliance using water from a pressurized water supply during operation of the appliance. The appliance has an electrically operated inlet valve connected to the water supply, the inlet valve being operated by a controller of the appliance. The safety valve has a valve body connected to the water supply upstream of the inlet valve, the valve body having a flow path for allowing water to flow through the valve body from the water supply to the inlet valve. The safety valve has an electrically operated solenoid and a valve gate connected to the solenoid. The valve gate is movably carried within the valve body, the gate being movable between a closed position that prevents water from flowing through the flow path and an open position that allows water to flow through the flow path. The solenoid is connected to the appliance, such that an electrical current from the control system to the inlet valve for opening the inlet valve is conducted to the solenoid for moving the gate to the open position. The gate is spring biased to the closed position for returning the gate to the closed position when the current ceases to flow.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
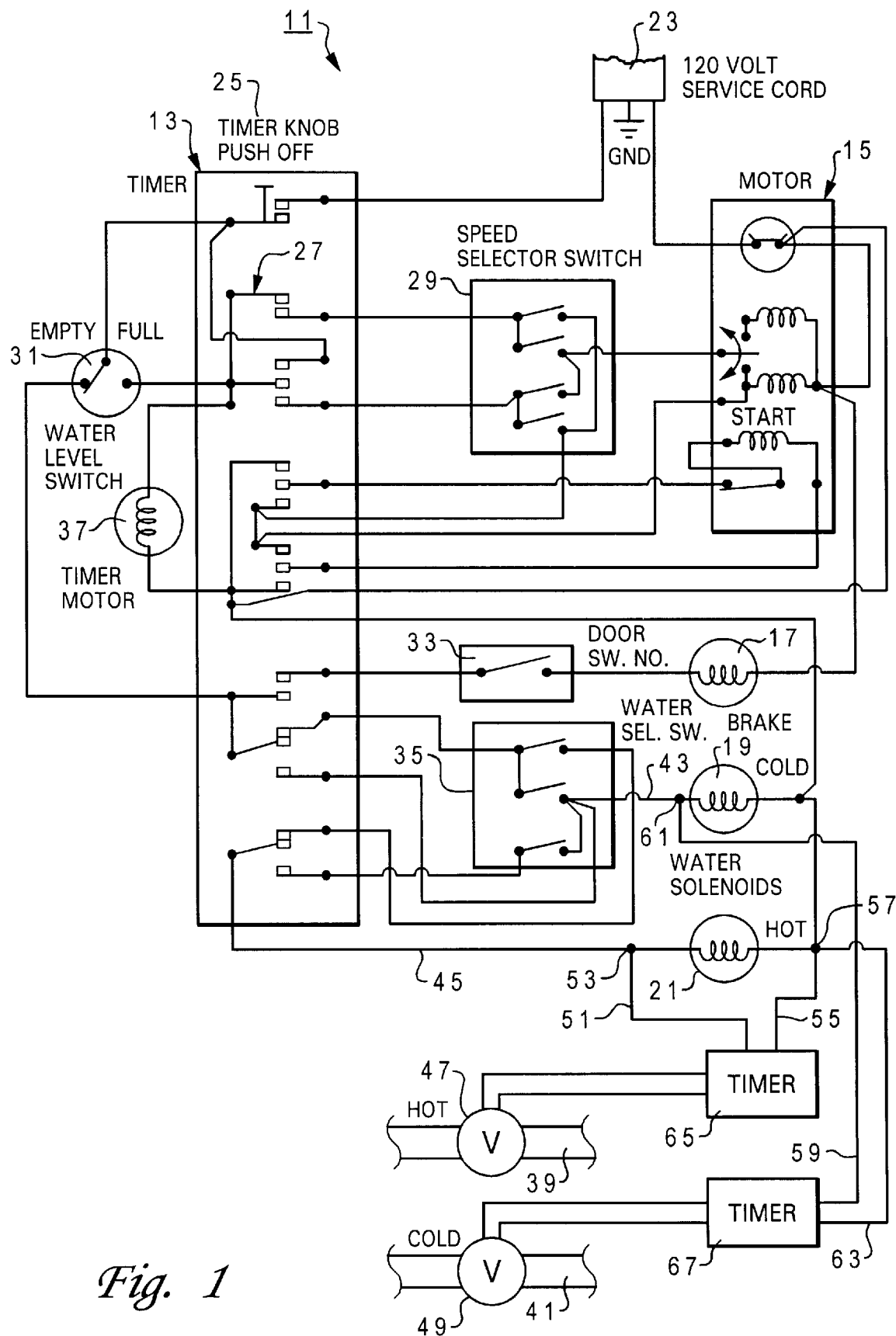
FIG. 1 is a schematic view of a control system and wiring for a washing machine, the washing machine being connected to safety valves constructed in accordance with the present invention.

FIG. 1 is a schematic diagram of elements in a control circuit 11 for a washing machine. Circuit 11 has a timer 13 for controlling motor 15, brake 17, and solenoids 19, 21 for water inlet valves (not shown). Electrical power is provided to circuit 11 through service cord 23.

Timer 13 is manipulated by a user to control the operation of the washing machine. A timer knob 25 is located on an outer surface of a control panel (not shown) that houses timer 13, timer knob 25 being pulled outward to activate timer 13 and pushed in to deactivate timer 13. Sets of switches, such as switch set 27, control the functioning of attached components. For example, switch set 27 controls motor 15, with speed selector switch 29 being connected between switch set 27 and motor 15. Water level switch 31 is connected to timer 13 for switching solenoids 19, 21 off and closing the inlet valves when water has reached a desired level within the washing machine. A door switch 33 controls brake 17 for stopping a spinning drum if a user opens the access door. Water selector switch 35 controls the opening of water solenoids 19, 21 for allowing hot or cold water (or both) to flow into the washing machine. A timer motor 37 turns knob 25 to cycle the washing machine through the various operations of a wash cycle.

Hot water is supplied to the washing machine under pressure through conduit 39, and cold water is supplied under pressure through conduit 41. Conduits 39, 41 are connected to ports (not shown) on the washing machine, and solenoids 19, 21 operate the inlet valves to control the flow of water through the ports. Timer 13 is connected to solenoids 19, 21 through wires 43, 45, respectively, for providing an electric current to cause solenoids 19, 21 to open the inlet valves, allowing water to flow into the washing machine through one or both valves. When the current ceases, solenoids 19, 21 close the inlet valves, preventing additional water from flowing into the washing machine.

To prevent unwanted flow of water through conduits 39, 41, for example, if one of conduits 39, 41 has ruptured, valves 47, 49 are installed in conduits 39, 41, respectively. Each valve 47, 49 preferably contains a solenoid that is spring-biased toward the closed position, valve 47 being shown in detail in FIG. 3 and further described below. Valves 47, 49 are moved to an open position, allowing water to flow through conduits 39, 41, only when timer 13 routes an electric current to water solenoids 19, 21.

To provide an electric current for operating valve 47, wire 51 is connected to wire 45 at node 53, and wire 55 is connected to common node 57. Wire 59 connects valve 49 to wire 43 at node 61, and wire 63 connects to common node 57. Optional timers 65, 67 may be connected between nodes 53, 57, 61 and valves 47, 49 for slightly delaying the opening of valves 47, 49 or limiting the amount of time that electrical current is supplied to keep valves 47, 49 open.

Figure 2:
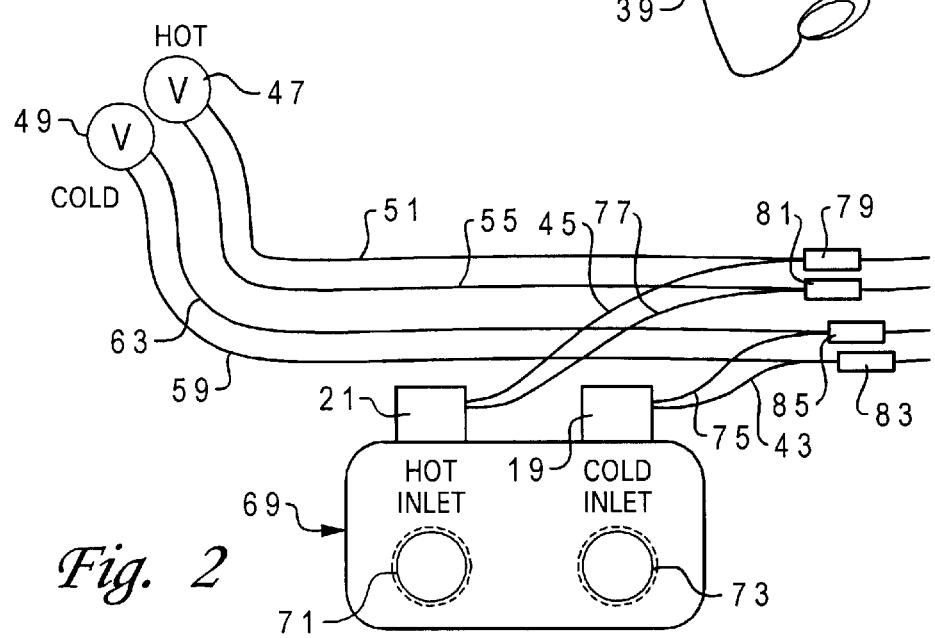
FIG. 2 is a rear view of an inlet valve assembly connected to the safety valves of FIG. 1.

FIG. 2 is a rear view of a valve assembly 69 containing solenoids 19, 21, valve assembly 69 being mounted to the washing machine. A hot-water hose (not shown) connects hot inlet 71 to an outlet of valve 47 for providing hot water, and a cold-water hose (not shown) connects cold inlet 73 to an outlet of valve 49 for providing cold water. As described above, solenoids 19, 21 are connected to timer 13 (FIG. 1) for controlling the release of water into the machine, and each valve 47, 49 is wired to open simultaneously with the corresponding valves in valve assembly 69. As each solenoid 19, 21 is energized, a valve (not shown) connected to the solenoid 19, 21 and within assembly 69 opens to allow water in the corresponding water hose to flow through inlet 71, 73 and into the washing machine.

FIG. 2 shows the preferred method for wiring valves 47, 49 to the wiring for solenoids 19, 21. Whereas the schematic view of FIG. 1 shows wires 55, 63 connected to node 57, wires 55, 63 will typically be connected to separate wires, such as wires 75, 77, which are paired with wires 43, 45, respectively, for conducting electricity through solenoids 19, 21. For valve 47, wire 51 is connected to wire 45 with connector 79, and wire 55 is connected to wire 77 with connector 81. For valve 49, wire 59 is connected to wire 43 with connector 83, and wire 63 is connected to wire 75 with connector 85. As timer 13 (FIG. 1) actuates one or both solenoids 19, 21 with an electrical current in pairs of wires 43, 75 and 45, 77, a portion of the current passes through wires 51, 55 to open valve 47, releasing hot water to flow to inlet 71, and/or through wires 59, 63 to open valve 49, releasing cold water to flow to inlet 73. Since one or both solenoids 19, 21 are also energized, water flows through valve assembly 69 into the washing machine.

Figure 3:
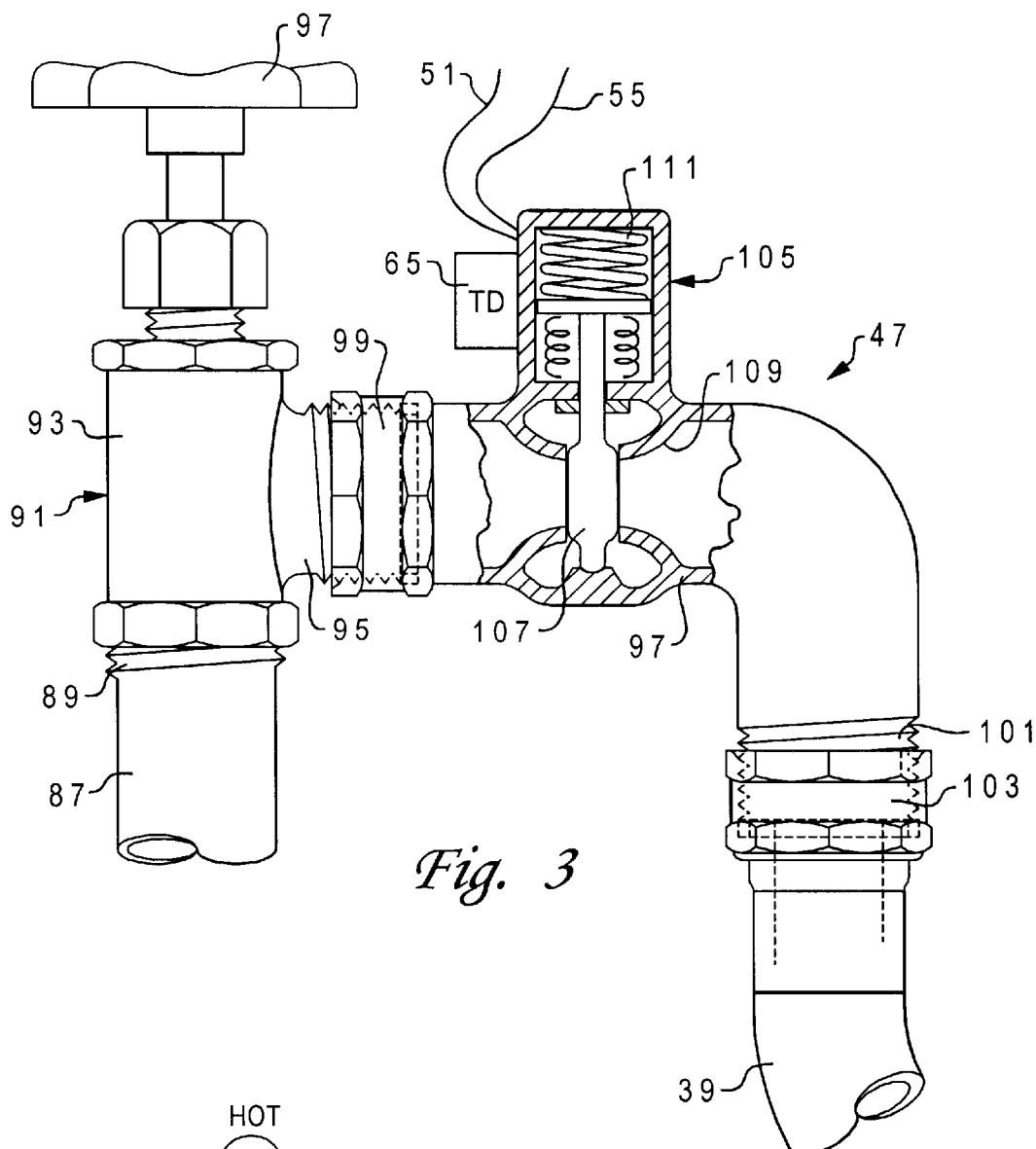
FIG. 3 is a side view of a safety valve of FIG. 1 installed at a water outlet.

FIG. 3 is a side view of installed valve 47, valve 49 being identical in construction and operation to valve 47. A water pipe 87 is a portion of the pressurized water system in a structure, pipe 87 typically being located in a wall. Pipe 87 terminates in a threaded end 89 onto which is secured a manual shutoff valve 91. Shutoff valve 91 has a valve section 93 that is parallel to the axis of pipe 87 and a threaded lateral tube 95 extending from valve section 93. A handle 97 at the upper end of shutoff valve 91 can be rotated to open or close valve 91. When valve 91 is open, water is allowed to flow from pipe 87, through valve section 93, and out of tube 95.

Valve 47 has a valve body having a threaded connector 99 and a threaded end 101 on the opposite end of the valve body. Connector 99 connects valve 47 to tube 95 of shutoff valve 91, and conduit 39 is connected to threaded end 101 with connector 103. Conduit 39 is preferably a flexible hose, but conduit 39 may be any type of tube normally used to carry water.

A solenoid 105 is connected to a valve gate 107 for moving gate 107, which engages a narrowed section 109 of the water flow path within the valve body. A spring 111 biases gate to the down, or closed, position shown in FIG. 3. When in this position, gate 107 prevents fluid from flowing through valve 47 and into conduit 39. Timer 65 is optionally mounted to valve 47 for limiting the amount of time solenoid 105 remains energized and/or for delaying the opening of gate 107 by delaying the energizing of solenoid 105. The time limit prevents valves 47, 49 from remaining open indefinitely in the case where a conduit 39, 41 bursts during filling of the washing machine. Wires 51, 55 provide electrical power for operating solenoid 105 and timer 55, electrical power being provided solely from the power supplied to solenoid 21.

Referring to the figures, in operation, valves 47, 49 are installed between shutoff valves 91 and conduits 39, 41, and wires 51, 55 and 59, 63 are connected to wires 45, 77 and 43, 75, respectively, in the washing machine. Timer 13 is then manipulated by a user to start a wash cycle, and, at various points in the cycle, timer 13 causes an electrical current to flow to one or both solenoids 19, 21 for opening valves in valve assembly 69. A portion of the current flows through wires 51, 55 and/or 59, 63 to valves 47, 49. The current energizes solenoid 105 in the corresponding valve 47, 49, lifting each gate 107 for allowing water to flow from pipe 87, through shutoff valve 91, through valve 47, 49, and into a conduit 39, 41. The water flows through conduit 39, 41 into an inlet 71, 73 and through valve body 69 to enter the washing machine. If a timer 65, 67 is used, timer 65, 67 operates to delay the energizing of solenoid 105 in each valve 47, 49 and/or stops the flow of current through solenoid 105 after a specified amount of time.

There are several advantages realized from using the present invention. The safety valves may be used with any appliance having electrically operated inlet valves for controlling the flow of water into the appliance. The safety valves do not require additional electrical power, since they are wired to the inlet valves of the appliance. Because the safety valves open when the appliance opens the inlet valves, no additional controller is needed. Installation is straightforward and simple, the safety valves being connected to the existing wiring of the appliance. A timer module may delay the energizing of the solenoid of each safety valve to limit the instantaneous current draw, and the timer may be used to limit the amount of time that the safety valve remins open.

While the invention has been shown in only one of its forms, it should be apparent to those skilled in the art that it is not so limited, but is susceptible to various changes without departing from the scope of the invention.

I claim:

1. In an appliance having at least one water inlet valve, each inlet valve being connected to a separate hose communicating pressurized water from a water line, each inlet valve being actuable by electric power supplied through an electrical line of a control system of the appliance, each inlet valve being actuable between a closed position that prevents water from flowing from the conduit through the inlet valve and an open position that allows water to flow from the conduit through the inlet valve, the improvement comprising:

a safety valve connected to each water line at a location upstream of each hose, each safety valve being electrically actuable between a closed position, which prevents water from flowing through the safety valve into the hose, and an open position, which allows water to flow through the safety valve into the hose, each safety valve being connected to one of the electrical lines of the control system of the appliance for being individually actuated simultaneously with each corresponding inlet valve by the electrical power supplied by the control system.

2. The appliance of claim 1, further comprising:

a timer operably connected to each safety valve for moving the safety valve to the closed position after a maximum amount of time.

3. The appliance of claim 1, further comprising:

a timer operably connected to each safety valve to delay actuation of the safety valve for a selected amount of time.

4. The appliance of claim 1, wherein:

each safety valve comprises an electrically actuated solenoid connected to a valve gate, the solenoid moving the gate to the open position when the solenoid is energized.

5. The appliance of claim 1, wherein:

each safety valve is spring biased toward the closed position.

6. A safety valve for an appliance using water from a pressurized water supply during operation of the appliance, the appliance having at least one electrically operated inlet valve connected to the water supply and operated by a controller of the appliance, each safety valve comprising in combination:

a valve body adapted to be connected to the water supply upstream of the inlet valve, the valve body having a flow path for allowing water to flow through the valve body from the water supply to the inlet valve;

an electrically operated solenoid;

a valve gate connected to the solenoid and movably carried within the valve body, the gate being movable between a closed position, which prevents water from flowing through the flow path, and an open position, which allows water to flow through the flow path; and wherein the solenoid is adapted to be directly connected to an output of the control system, such that a portion of an electrical current from the control system to the inlet valve for opening the inlet valve is conducted to the solenoid for moving the gate to the open position.

7. The safety valve of claim 6, further comprising:

a timer for allowing the valve gate to move to the closed position after a maximum amount of time.

8. The appliance of claim 6, further comprising:

a timer for delaying movement of the valve gate for a selected amount of time.

9. The safety valve of claim 6, wherein:

the valve gate is spring biased toward the closed position.

10. A method of preventing unwanted flow of water through each hose connecting an appliance to a pressurized water supply, the appliance having a control system for supplying power through an electrical line to an electrically operated water inlet valve for each water supply, the method comprising:

(a) mechanically connecting an electrically operated safety valve to the pressurized water supply upstream of each hose;

(b) electrically connecting each safety valve to the electrical line between the control system and the inlet valve;

(c) opening the inlet valve by supplying power from the control system through the electrical line and simultaneously supplying power from the electrical line to the safety valve, thereby opening the safety valve.

11. The method of claim 10, wherein:

step (c) comprises using a timer to close the safety valve after a selected period of time.

12. The method of claim 10, wherein:

step (c) comprises using a timer to delay the opening of the safety valve for a selected period of time.

* * * * *